United States Patent
Ishii et al.

(10) Patent No.: US 10,112,677 B2
(45) Date of Patent: Oct. 30, 2018

(54) STRADDLE VEHICLE

(71) Applicant: Kawasaki Jukogyo Kabushiki Kaisha, Kobe-shi, Hyogo (JP)

(72) Inventors: Hiroshi Ishii, Kobe (JP); Tomo Yamamoto, Kobe (JP); Daisuke Saeki, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 15/102,501

(22) PCT Filed: Dec. 19, 2013

(86) PCT No.: PCT/JP2013/007465
§ 371 (c)(1),
(2) Date: Jun. 7, 2016

(87) PCT Pub. No.: WO2015/092834
PCT Pub. Date: Jun. 25, 2015

(65) Prior Publication Data
US 2016/0318573 A1    Nov. 3, 2016

(51) Int. Cl.
    *B62K 25/04*       (2006.01)
    *B62J 99/00*       (2009.01)
             (Continued)

(52) U.S. Cl.
    CPC .............. *B62K 25/04* (2013.01); *B62J 99/00* (2013.01); *B62K 25/005* (2013.01); *B62J 2099/002* (2013.01); *B62M 9/00* (2013.01)

(58) Field of Classification Search
CPC .............................. B62K 25/04; B62K 25/005
See application file for complete search history.

(56) References Cited

U.S. PATENT DOCUMENTS 4,742,884 A *   5/1988   Ishikawa ................. B60T 1/065
                                                             180/219
4,794,998 A *   1/1989   Iwai ...................... B62K 25/005
                                                             180/219
(Continued)

FOREIGN PATENT DOCUMENTS

JP        S61143274 A     6/1986
JP        S6223786 U      2/1987
(Continued)

OTHER PUBLICATIONS

ISA Japanese Patent Office, Written Opinion of the International Searching Authority Issued in Application No. PCT/JP2013/007465, dated Mar. 25, 2014, WIPO, 6 pages.
(Continued)

*Primary Examiner* — Joseph M Rocca
*Assistant Examiner* — Michael R Stabley
(74) *Attorney, Agent, or Firm* — Alleman Hall Creasman & Tuttle LLP

(57) ABSTRACT

A straddle-type vehicle comprises a vehicle body frame; an axle which is rotatable integrally with a wheel; a swing arm having a front end portion pivotably mounted to the vehicle body frame, and a rear end portion to which the axle is rotatably mounted; a first coupling member to which rotational driving power from a driving source is transmitted is coaxially, rotatably mounted to the axle via a bearing; and a second coupling member coaxial with the axle and including a joining portion non-rotatably joined to the axle, a fitting portion fitted to the first coupling member via a buffering member, and a coupling portion for coupling the joining portion to the fitting portion, wherein the coupling portion is placed axially outward relative to the first coupling member, and the joining portion extends from axially outside between the first coupling member and the axle.

16 Claims, 4 Drawing Sheets

(51) Int. Cl.
  *B62K 25/00*  (2006.01)
  *B62M 9/00*  (2006.01)

(56) References Cited

U.S. PATENT DOCUMENTS

| | | | | |
|---|---|---|---|---|
| 4,809,802 | A * | 3/1989 | Seino | B62K 25/005 |
| | | | | 180/227 |
| 4,993,508 | A * | 2/1991 | Nozoe | B62J 13/00 |
| | | | | 180/219 |
| 5,240,087 | A * | 8/1993 | Parker | B62M 9/16 |
| | | | | 180/227 |
| 7,931,538 | B2 * | 4/2011 | Martinek | F16F 15/124 |
| | | | | 464/73 |
| 8,381,892 | B2 * | 2/2013 | Sakuyama | F16D 23/12 |
| | | | | 192/112 |

FOREIGN PATENT DOCUMENTS

| | | |
|---|---|---|
| JP | S6223787 U | 2/1987 |
| JP | S62144704 U | 9/1987 |
| JP | S6347992 U | 3/1988 |
| JP | H01104886 U | 7/1989 |
| JP | H03178890 A | 8/1991 |
| JP | H0443181 A | 2/1992 |
| JP | H0688549 B2 | 11/1994 |
| JP | 2010006345 A | 1/2010 |

OTHER PUBLICATIONS

ISA Japanese Patent Office, International Search Report Issued in Application No. PCT/JP2013/007465, dated Mar. 25, 2014, WIPO, 4 pages.

* cited by examiner

STRADDLE VEHICLE

TECHNICAL FIELD

The present invention relates to a straddle-type vehicle steered by a rider straddling a seat.

BACKGROUND ART

In a swing arm of an exemplary motorcycle, the rear end portion of the swing arm supports the center portion of an axle (e.g., Patent Literature 1). In the swing arm in which the rear end portion supports the center portion of the axle, the axle is rotatable with respect to the swing arm, and a wheel hub is mounted on the axle in such a manner that the wheel hub is rotatable together with the axle.

In the rear wheel portion of an exemplary motorcycle, a sprocket around which a chain for transmission of driving power is coupled to an axle via a damper. In the above-described swing arm in which the rear end portion supports the center portion of the axle, a first coupling member (sprocket member) around which the chain is wrapped is relatively rotatable with respect to the axle, and a convex portion formed on the side surface of a second coupling member which is spline-coupled to the axle is fitted into a recess formed on the side surface of the first coupling member via a damper member.

CITATION LIST

Patent Literature

Patent Literature 1: Japanese Laid-Open Patent Application Publication No. S61-143274

SUMMARY OF INVENTION

Technical Problem

To transmit the driving power stably, it is desirable to increase the area of a region of the second coupling member and a region of the axle which are coupled to each other. However, if the area of the region of the second coupling member and the region of the axle which are coupled to each other is increased, the size of the axle is increased.

In view of the above, an object of the present invention is to increase a strength of a driving power transmission mechanism while preventing an increase in the size of the axle.

Solution to Problem

To achieve the above-described object, a straddle-type vehicle comprises a vehicle body frame to which a driving source for generating traveling driving power is mounted; an axle which is rotatable integrally with a wheel; a swing arm having a front end portion mounted to the vehicle body frame in such a manner that the swing arm is pivotable, and a rear end portion to which the axle is rotatably mounted; a first coupling member which includes a driven member to which rotational driving power from the driving source is transmitted, is placed coaxially with the axle, and is mounted to the axle via a bearing in such a manner that the first coupling member is relatively rotatable with respect to the axle; and a second coupling member including a joining portion joined to the axle in such a manner that the joining portion is rotatable together with the axle, a fitting portion fitted to the first coupling member via a buffering member, and a coupling portion for coupling the joining portion to the fitting portion, the second coupling member being placed coaxially with the axle, wherein the coupling portion is placed at a location that is outward in an axial direction of the axle relative to the first coupling member, and wherein the joining portion extends from outside in the axial direction to a region located between the first coupling member and the axle.

In accordance with this configuration, the joining portion of the second coupling member is joined to a portion of the axle which is located outward in the axial direction relative to the first coupling member, and to a portion of the axle which overlaps with the first coupling member in the axial direction. This structure can increase the axial dimension of the portion of the second coupling member which is coupled to the axle. Thus, the strength of the portion through which the driving power is transmitted from the second coupling member to the axle, can be increased, even though a driving power transmission mechanism has a compact configuration as a whole.

The driven member may be placed to overlap with the buffering member and the fitting portion, when viewed from a direction perpendicular to the axial direction.

In accordance with this configuration, when the buffering member absorbs an acceleration impact transmitted from the driving source to the driven member, it becomes possible to suppress a situation in which a force is concentratively transmitted to the axially localized portion of the buffering member.

The bearing may be placed to at least partially overlap with the driven member, when viewed from a direction perpendicular to the axial direction.

In accordance with this configuration, the bearing can be placed at a portion of the first coupling member, on which a load concentrates due to an acceleration impact transmitted from the driving source to the driven member. As a result, the performance of the bearing can be improved and the life of the bearing can be extended.

The first coupling member may further include a tubular inner peripheral wall provided coaxially with the axle, a tubular outer peripheral wall which is provided coaxially with the axle and located radially outward relative to the inner peripheral wall, and a side wall of an annular disc shape which is provided coaxially with the axle and couples the outer peripheral wall to the inner peripheral wall, and the driven member and the bearing may be placed to correspond to an intermediate portion of the outer peripheral wall in the axial direction and an intermediate portion of the inner peripheral wall in the axial direction, respectively.

In accordance with this configuration, a portion of the first coupling member to which the rotational driving power is transmitted from the driving source and a portion of the first coupling member which is supported by the bearing are provided at the intermediate location of the first coupling member in the axial direction. As a result, the first coupling member can be supported stably.

The bearing may be placed between an inner peripheral surface of the first coupling member and an outer peripheral surface of the axle, an inner race of the bearing may be supported from inside in a vehicle width direction, by a protruding portion of the axle which protrudes radially outward, and an outer race of the bearing may be supported from inside in the vehicle width direction, by the first coupling member.

In accordance with this configuration, the second coupling member can be positioned in the axial direction with respect to the axle by use of the bearing for the first coupling member.

The axle may be provided with a first spline groove, the second coupling member may be provided with a coupling spline groove which is spline-coupled to the first spline groove, and in a state in which the second coupling member is coupled to the axle, the first spline groove may extend farther inward in the axial direction than the coupling spline groove in such a manner that an inner end of the first spline groove in the axial direction is located inward in the axial direction relative to an inner end of the coupling spline groove in the axial direction.

In accordance with this configuration, the spline-fitted portion can be increased without increasing the length of the axle. Thus, with a compact configuration, the second coupling member and the axle can be more firmly coupled to each other.

The straddle-type vehicle may further comprise: a hub coupled to the axle, the second coupling member and the hub may be coupled to each other in such a manner that the second coupling member and the hub are slidable in the axial direction with respect to the axle, and are rotatable together with the axle, the axle may include a first stepped portion which protrudes radially outward at an intermediate portion in the axial direction, and faces a first side in the axial direction, and a second stepped portion which protrudes radially outward at the intermediate portion in the axial direction, and faces a second side in the axial direction, the first and second coupling members may be fastened from the first side in the axial direction, by a first fastener member in such a manner that the first and second coupling members are positioned in the axial direction directly or indirectly by the first stepped portion, and the hub may be fastened from the second side in the axial direction, by a second fastener member in such a manner that the hub is positioned in the axial direction directly or indirectly by the second stepped portion.

In accordance with this configuration, the first and second coupling members and the hub can be more easily mounted to the axle from the both sides in the axial direction.

The axle may be provided with a second spline groove to which the hub is spline-coupled, the hub may be provided with a hub spline groove which is spline-coupled to the second spline groove, and in a state in which the hub is coupled to the axle, the second spline groove may extend farther inward in the axial direction than the hub spline groove does in such a manner that an inner end of the second spline groove in the axial direction is located inward in the axial direction relative to an inner end of the hub spline groove in the axial direction.

In accordance with this configuration, the spline-fitted portion can be increased without increasing the length of the axle. Thus, with a compact configuration, the hub and the axle can be more firmly coupled to each other.

A swelling portion of the swing arm, which protrudes outward in the axial direction to a greatest degree, and includes both side surfaces in the axial direction, may have a structure in which an inner element located inward in the axial direction and an outer element located outward in the axial direction are welded to each other.

In accordance with this configuration, the outer element of the swelling portion, which is most easily noted, of the swing arm, is made different from the inner element and welded to the inner element. Therefore, the outer element can be formed by the member with a surface roughness which is less than that of the inner element. As a result, the external appearance can be improved easily and effectively.

Advantageous Effects of Invention

As should be clearly understood from the above, in accordance with the present invention, a strength of a portion of a driving power transmission mechanism through which driving power is transmitted from a second coupling member to an axle can be increased, even though the driving power transmission mechanism has a compact configuration as a whole.

DESCRIPTION OF EMBODIMENTS

Hereinafter, the embodiment will be described with reference to the accompanying drawings. The directions stated below are from the perspective of a rider straddling the vehicle.

Figure 1:
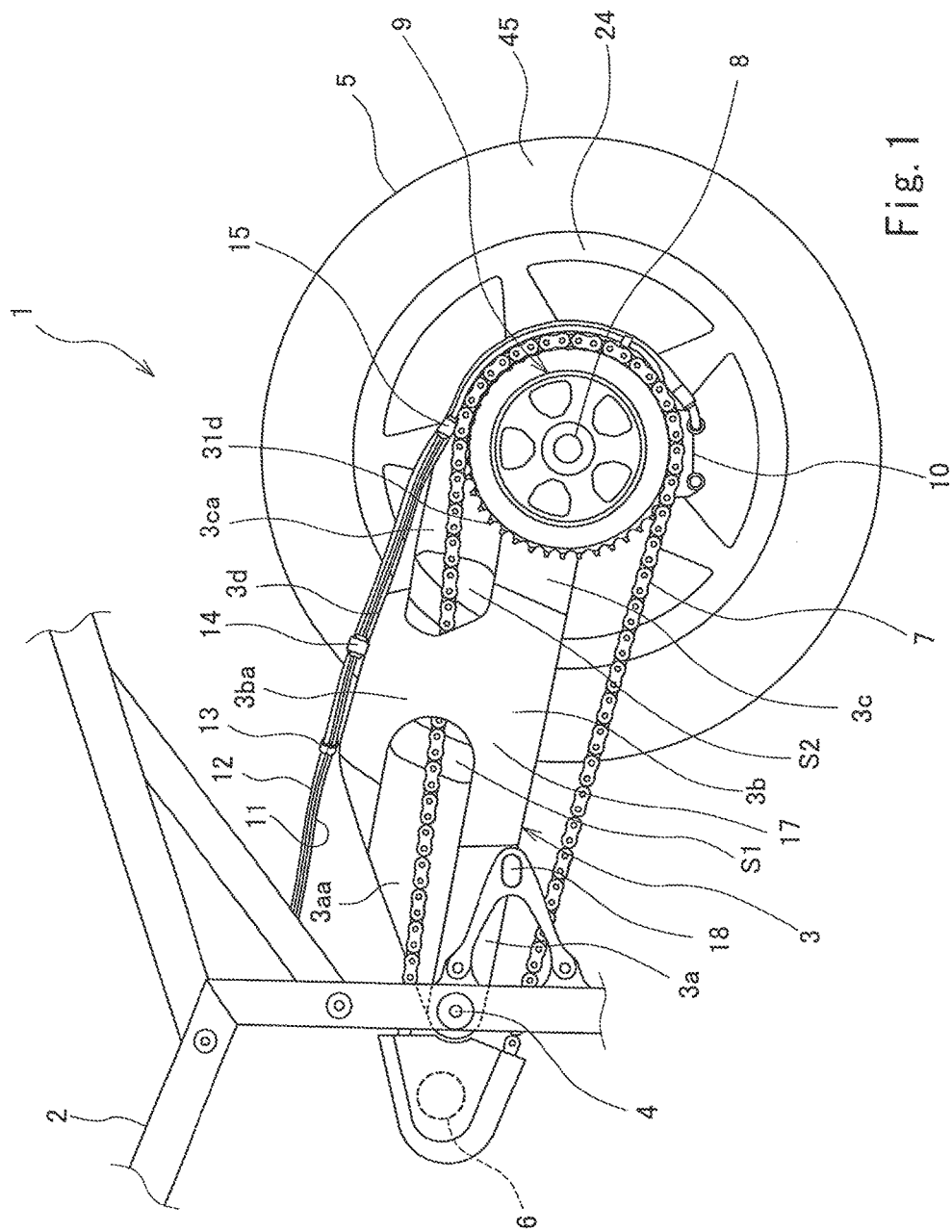
FIG. 1 is a left side view of the major components of a motorcycle according to an embodiment.

FIG. 1 is a left side view of the major components of a motorcycle 1 according to the embodiment. As shown in Fig, 1, in the motorcycle 1, the front end portion of a swing arm 3 extending substantially in a forward and rearward direction is mounted to a vehicle body frame 2 by a pivot shaft 4 in such a manner that the swing arm 3 is pivotable, while a rear wheel 5 is rotatably mounted to the rear end portion of the swing arm 3. A driving source (e.g., engine) which is not shown and generates traveling driving power and a transmission connected to the driving source are mounted to the vehicle body frame 2. Rotational driving power output from an output shaft 6 of the transmission is transmitted to the rear wheel 5 via an endless driving power transmission loop 7 (e.g., drive chain). An axle 8 of the rear wheel 5 is rotatable integrally with the rear wheel 5. A damper device 9 including a driven member 31d (e.g., sprocket member) around which the driving power transmission loop 7 is wrapped is connected to the axle 8. In other words, the rotational driving power of the driving power transmission loop 7 is transmitted to the rear wheel 5 via the damper device 9.

The rear portion of the swing arm 3 is provided with a vehicle speed sensor (not shown) which detects the vehicle speed (rotational speed) of the rear wheel 5, and a brake caliper 10 which causes a brake disc 26 (see FIG. 2) to hydraulically contact a friction pad (not shown) and to be retained by the friction pad. A sensor cable 11 connected to the vehicle speed sensor and a hydraulic pipe 12 connected to the brake caliper 10 are provided to extend along an upper end surface 3*d* of the swing arm 3, and are positioned with respect to the swing arm 3 by clamp members 13 to 15.

The swing arm 3 includes a front portion 3*a*, an intermediate portion 3*b*, and a rear portion 3*c* which are arranged in the forward and rearward direction and connected to each other by welding. The swing arm 3 is formed with a pair of openings S1, S2 which are placed to be spaced apart from each other in the forward and rearward direction. A portion 3*ba* of the swing arm 3, which is interposed between the front opening S1 and the rear opening S2 and overlaps with the driving power transmission loop 7, when viewed from the side, is located outward in a vehicle width direction relative to the driving power transmission loop 7. A portion 3*aa* of the swing arm 3, which is located in front of the front opening S1 and overlaps with the driving power transmission loop 7 when viewed from the side, is located inward in the vehicle width direction relative to the driving power transmission loop 7. A portion 3*ca* of the swing arm 3, which is located rearward relative to the rear opening S2 and overlaps with the driving power transmission loop 7 when viewed from the side, is located inward in the vehicle width direction relative to the driving power transmission loop 7.

Specifically, the driving power transmission loop 7 extends through the openings S1, S2 in the forward and rearward direction, the intermediate portion 3*b* of the swing arm 3 covers the driving power transmission loop 7 from outside in the vehicle width direction, and the front portion 3*a* and the rear portion 3*c* do not cover the driving power transmission loop 7 from outside in the vehicle width direction. In the present embodiment, the front portion 3*a* and the rear portion 3*c* of the swing arm 3 include grooves, respectively, which are recessed inward in the vehicle width direction and extend in the forward and rearward direction, and the bottom walls (namely, the portions 3*aa*, 3*ca*) of the grooves overlap with the driving power transmission loop 7 from inside in the vehicle width direction, when viewed from the side. The intermediate portion 3*b* of the swing arm 3 includes a groove which is recessed outward in the vehicle width direction and extends in the forward and rearward direction, and the bottom wall (namely, the portion 3*ba*) of the groove overlaps with the driving power transmission loop 7 from outside in the vehicle width direction, when viewed from the side. Foot rests 18 on which the rider puts feet are attached to the vehicle body frame 2. The foot rests 18 overlap with the front portion 3*a* of the swing arm 3 when viewed from the side and outside in the vehicle width direction.

The openings S1, S2 open to both sides in the vehicle width direction. The openings S1, S2 also open in a direction in which the swing arm 3 extends, to be precise, a direction in which the pivot shaft 4 and the rear wheel axle 8 are connected to each other. The driving power transmission loop 7 extending through the openings S1, S2 of the swing arm 3 in the forward and rearward direction includes an upper portion located above a virtual plane connecting the pivot shaft 4 and the rear wheel axle 8 to each other and a lower portion located below the virtual plane. The driving power transmission loop 7 has a loop shape in which the upper portion and the lower portion are turned back around the pivot shaft 4 and the rear wheel axle 8 and connected to each other. In the present embodiment, the upper portion of the driving power transmission loop 7 is located above the lower edge of the swing arm 3 and extends through the openings S1, S2. The lower portion of the driving power transmission loop 7 extends through a region that is below the lower edge of the swing arm 3.

Figure 2:
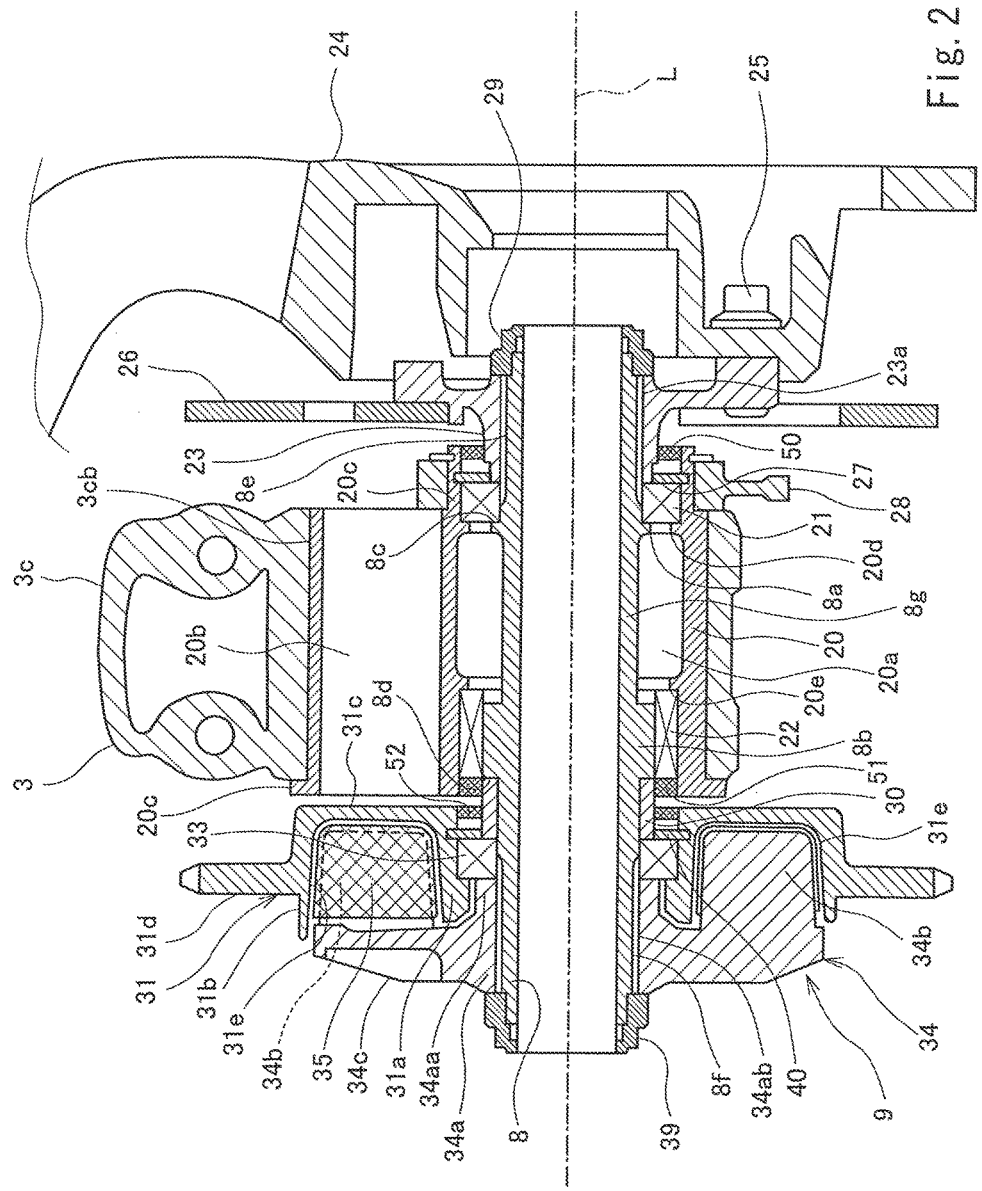
FIG. 2 is a cross-sectional view of the major components which is taken along a rear wheel axle of the motorcycle of FIG. 1.

FIG. 2 is a cross-sectional view of the major components which is taken along the axle 8 of the rear wheel 5 of the motorcycle 1 of FIG. 1. As shown in FIG. 2, the rear portion 3*c* of the swing arm 3 supports a center portion 8*g* of the axle 8 of the rear wheel 5 (see FIG. 1) in such a manner that the axle 8 is rotatable. Specifically, the rear portion 3*c* of the swing arm 3 is formed with a fitting hole 3*cb* of a perfect-circle shape which opens toward the both sides in the vehicle width direction. An eccentric 20 is internally fitted to the fitting hole 3*cb*. The eccentric 20 includes an eccentric hole 20*a* which is eccentric when viewed from the side and into which the axle 8 is inserted, and a plurality of through-hole 20*b* for lightening which open toward the both sides in an axial direction L (vehicle width direction) of the axle 8. The outer end potion in the axial direction L of the outer peripheral wall of the eccentric 20 is provided with a plurality of tabs 20*c* which are spaced apart from each other in a circumferential direction and protrude radially outward.

The center portion 8*g* of the axle 8 is provided with a pair of right and left protruding portions 8*a*, 8*b* protruding radially outward. A bearing 21 is in contact with the right end of the right protruding portion 8*a* from the right. Specifically, the right end of the right protruding portion 8*a* is a stepped portion 8*c* which protrudes radially outward at the intermediate portion 8*g* in the axial direction L, faces the right in the axial direction L, and has an increased diameter to position the bearing 21 from inside in the axial direction L. A bearing 22 is externally fitted to the outer peripheral surface of the left annular protruding portion 8*b*. The eccentric 20 supports the axle 8 via the bearings 21, 22. In other words, the axle 8 is mounted to the swing arm 3 via the two bearings 21, 22 placed to be spaced to be spaced apart from each other. In the present embodiment, each of the bearings 21, 22 is a ball bearing in which a ball is accommodated between an inner race and an outer race.

The eccentric 20 includes on an inner peripheral portion thereof protruding portions 20*d*, 20*e* protruding radially inward. In the present embodiment, the pair of right and left protruding portions 20*d*, 20*e* are placed to be spaced from each other. The left end surface of the outer race of the right bearing 21 is in contact with the right end surface of the right protruding portion 20*d* to inhibit the right bearing 21 from moving to the left. Likewise, the right end surface of the outer race of the left bearing 22 is in contact with the left end surface of the left protruding portion 20*e* to inhibit the left bearing 22 from moving to the right.

The outer peripheral surface of the right portion of the axle 8 is provided with a spline groove 8*e*. A hub 23 is provided with a hub spline groove 23*a* fitted to the spline groove 8*e*. The hub 23 is spline-coupled to the axle 8 from outside in the axial direction L. More specifically, the hub 23 is coupled to the axle 8 in such a manner that the hub 23 is slidable in the axial direction L and rotatable together with the axle 8. The spline groove 8*e* extends to a location at which the spline groove 8*e* overlaps with the bearing 21 in the axial direction L. The tip end of the spline groove 8*e* is located immediately below the bearing 21. More specifically, in a state in which the hub 23 is coupled to the axle 8, the spline groove 8*e* extends farther inward in the axial direction L than the hub spline groove 23*a* does in such a manner that the inner end of the spline groove 8*e* in the axial direction L is located inward in the axial direction L relative to the inner end of the hub spline groove 23*a* in the axial direction L. In this structure, the inner tip end of the hub 23 in the axial direction L is in direct contact with the outer end surface of the inner race of the bearing 21 in the axial direction L, and presses the bearing 21 toward the stepped portion 8c. A circlip 27 is in contact with the inner end surface of the outer race of the bearing 21 in the axial direction L and is engaged with the eccentric 20.

A wheel 24 is fastened to the hub 23 by use of a fastener member 25. A tire 45 (see FIG. 3) is attached to a rim 24a of the wheel 24. The axle 8 is rotatable integrally with the rear wheel 5 (see FIG. 1). The brake disc 26 is fastened to the hub 23. A caliper holder 28 which supports the brake caliper 10 (see FIG. 1) for holding and braking the brake disc 26 is fastened to the eccentric 20 and the swing arm 3. A fastener member 29 (e.g., nut) is attached to the right end portion of the axle 8 to prevent disengagement of the hub 23 from the axle 8. The inner end surface of the fastener member 29 in the axial direction L is in direct contact with the hub 23. Specifically, the hub 23 is tightened by the fastener member 29 from the right so that the hub 23 is indirectly positioned in the axial direction L by the stepped portion 8a.

A damper device 9 is mounted to the left portion of the axle 8 to transmit the rotational driving power of the driving power transmission loop 7 (see FIG. 1) to the axle 8 while absorbing an impact. The damper device 9 includes a first coupling member 31 to which the rotational driving power from the driving power transmission loop 7 is transmitted, a bearing 33 which supports the first coupling member 31 on the axle 8 in such a manner that the first coupling member 31 is relatively rotatable with respect to the axle 8, a second coupling member 34 connected to the first coupling member 31 and coupled to the axle 8 in such a manner that the second coupling member 34 is rotatable together with the axle 8, and a buffering member 35 interposed between the first coupling member 31 and the second coupling member 34 to absorb an impact transmitted from the first coupling member 31 to the second coupling member 34.

A cylindrical sleeve 30 is in contact with the left end of the left annular protruding portion 8b, from the left. The bearing 33 is in contact with the left end of the sleeve 30, from the left. Specifically, the left end of the annular protruding portion 8b is a stepped portion 8d which protrudes radially outward at the intermediate portion 8g in the axial direction L, faces the left in the axial direction L, and has an increased diameter to position the bearing 33 from inside in the axial direction L via the sleeve 30. The sleeve 30 is made of a material with a specific gravity which is lower than that of the axle 8, to reduce weight. In the present embodiment, the axle 8 is made of a steel, while the sleeve 30 is made of an aluminum alloy.

The first coupling member 31 is externally fitted to the axle 8 via the bearing 33. Specifically, the bearing 33 is interposed between the inner peripheral surface of the first coupling member 31 and the outer peripheral surface of the axle 8. The length of the bearing 33 in the axial direction L is shorter than that of the inner peripheral surface of the first coupling member 31. In the present embodiment, the length of the bearing 33 in the axial direction L is equal to or less than a half of the length of the inner peripheral surface of the first coupling member 31 in the axial direction L.

The first coupling member 31 includes a tubular inner peripheral wall 31a provided coaxially with the axle 8, a tubular outer peripheral wall 31b which is provided coaxially with the axle 8 and spaced radially outward from the inner peripheral wall 31a, a side wall 31c of an annular disc shape which is provided coaxially with the axle 8 and couples the outer peripheral wall 31b to the inner peripheral wall 31a, and a driven member 31d (e.g., sprocket) which protrudes radially outward from the intermediate portion of the outer peripheral wall 31b in the axial direction L and to which the rotational driving power from the driving power transmission loop 7 is transmitted. The first coupling member 31 includes a plurality of partition walls which are provided to be spaced apart from each other in a circumferential direction to partition an annular space which is surrounded by the inner peripheral wall 31a, the outer peripheral wall 31b and the side wall 31c, and opens to the left in the axial direction L, into spaces arranged in the circumferential direction, although the partition walls are not shown.

The first coupling member 31 is provided with a plurality of fitted portions 31d which are a plurality of recesses placed to be spaced apart from each other in the circumferential direction and open to the left in the axial direction L, by the inner peripheral wall 31a, the outer peripheral wall 31b, the side wall 31c, and the partition walls (not shown). The driven member 31d is placed to partially overlap with the bearing 33, when viewed from a direction (radial direction) perpendicular to the axial direction L. The driven member 31d and the bearing 33 are placed to correspond to the intermediate portion of the outer peripheral wall 31b in the axial direction L and the intermediate portion of the inner peripheral wall 31a in the axial direction L, respectively.

The second coupling member 34 includes a joining portion 34a coupled to the axle 8, a plurality of fitting portions 34b which are a plurality of convex portions to be fitted to the plurality of fitted portions 31e of the first coupling member 31, respectively, from the left in the axial direction L, and a coupling portion 34c for coupling the joining portions 34a to the fitting portions 34b. The coupling portion 34c is placed outward in the axial direction L relative to the first coupling member 31. The buffering member 35 is interposed in a direction of driving power transmission between the fitted portion 31e of the first coupling member 31 and the fitting portion 34b of the second coupling member 34. The buffering member 35 is made of, for example, an elastic material such as rubber. The buffering member 35 and the fitting portions 34b are placed to overlap with the driven member 31d of the first coupling member 31 when viewed from the direction perpendicular to the axial direction L.

The outer peripheral surface of the left portion of the axle 8 is provided with a spline groove 8f. The joining portion of the second coupling member 34 is provided with a coupling spline groove 34ab to be fitted to the spline groove 8f. The second coupling member 34 is spline-coupled to the axle 8 from outside in the axial direction L. Specifically, the second coupling member 34 is coupled to the axle 8 in such a manner that the second coupling member 34 is slidable in the axial direction L with respect to the axle 8 and is rotatable together with the axle 8. The spline groove 8f extends to a location at which the spline groove 8f overlaps with the bearing 33 in the axial direction L. The tip end of the spline groove 8f is located immediately below the bearing 33. In a state in which the second coupling member 34 is coupled to the axle 8, the spline groove 8f extends farther inward in the axial direction L than the coupling spline groove 34ab does in such a manner that the inner end of the spline groove 8f in the axial direction L is located inward in the axial direction L relative to the inner end of the coupling spline groove 34ab in the axial direction L.

The sleeve 30 is placed between the inner race of the bearing 33 and the stepped portion 8d. A circlip 40 is in contact with the inner end surface of the outer race of the bearing 33 in the axial direction L and is engaged with the first coupling member 31. More specifically, the inner race of the bearing 33 is positioned from inside in the vehicle width direction, by the annular protruding portion 8b of the axle 8, protruding radially outward, while the outer race of the bearing 33 is positioned from inside in the vehicle width direction, by the first coupling member 31 via the circlip 40.

The joining portion 34a of the second coupling member 34 includes an extended portion 34aa extending in the inward direction of the axial direction, from outside in the axial direction L to a region that is between the first coupling member 31 and the axle 8. Specifically, the extended portion 34aa extends into an annular space formed between the first coupling member 31 and the axle 8, from outside in the axial direction L. In this structure, the inner tip end (tip end of the extended portion 34aa) in the axial direction L of the joining portion 34a of the second coupling member 34 is in direct contact with the bearing 33, and presses the bearing 33 toward the stepped portion 8d.

A fastener member 39 (e.g., nut) is attached to the left end portion of the axle 8 to prevent disengagement of the second coupling member 34 from the axle 8. The inner end surface of the fastener member 39 in the axial direction L is in direct contact with the second coupling member 34. The second coupling member 34 is tightened by the fastener member 39 from the left so that the second coupling member 34 is indirectly positioned in the axial direction L by the stepped portion 8b.

The joining portion 34a of the second coupling member 34 extends to a location at which the joining portion 34a overlaps with the first coupling member 31 when viewed from the radial direction of the axle 8. In other words, the axial inner end surface of the joining portion 34a is located inward in the axial direction L relative to the axial outer end surface of the first coupling member 31. In the present embodiment, the axial inner end surface of the joining portion 34a is located inward in the axial direction L relative to the axial outer side surface of the driven member 31d. The joining portion 34a is located to be in close proximity to the bearing 33 supporting the first coupling member 31 on the axle 8 in such a manner that the first coupling member 31 is rotatable with respect to the axle 8, and faces the bearing 33 from outside in the axial direction. Specifically, the joining portion 34a is in contact with the inner race (portion which is rotatable integrally with the axle 8) of the bearing 33 from outside in the axial direction L. Since the joining portion 34a has such a structure, the axial dimension of the joining portion 34a can be increased. In the present embodiment, the axial dimension of the joining portion 34a is substantially equal to that of the first coupling member 31.

The axial outer end surface of the joining portion 34a is located outward in the axial direction relative to the coupling portion 34c. In other words, the coupling portion 34c protrudes radially outward from the axial intermediate portion of the joining portion 34a. In this structure, the joining portion 34a can be extended to a location that is outward in the axial direction relative to the coupling portion 34c. Thus, the axial dimension of the joining portion 34a can be increased.

The bearing 33 is placed inward relative to the axial outer side surface of the first coupling member 31. The bearing 33 is placed to overlap with the driven member 31d in the radial direction. The bearing 33 is provided at the inner side of the first coupling member 31. The axial center of the bearing 33 is located inward relative to the axial center line of the first coupling member 31. This structure makes it possible to increase the axial dimension of the joining portion 34a which is in contact with the bearing 33.

Since the coupling portion 34c is placed outward in the axial direction relative to the first coupling member 31, the coupling portion 34c can be expanded in the outward direction of the axial direction than the first coupling member 31 is, and a strength of the second coupling member 34 can be increased. To prevent the strength of the second coupling member 34 from becoming unnecessarily high, the coupling portion 34c may be provided with a convex portion (e.g., rib) protruding outward in the axial direction. This can reduce the weight of the second coupling member 34 while increasing the strength of the second coupling member 34.

The fastener members 29, 39 are mounted to the both ends of the axle 8 to press the members (e.g., the hub 23 and the second coupling member 34) which are externally fitted to the axle 8 to move these members in the axial direction. Thereby, the members externally fitted to the axle 8 press the inner race of at least one of the two bearings 21, 22 toward the protruding portion 8a, 8b. In this way, at least one of the two bearings 21, 22 is positioned with respect to the eccentric 20 in the axial direction. The fastener member 29 is mounted to the end portion of the axle 8 in such a manner that the fastener member 29 presses the member (e.g., hub 23) which is externally fitted to the axle 8 to move this member in the axial direction. Thereby, the member which is externally fitted to the axle 8 presses the inner races of the two bearings 21, 22 toward the protruding portion 20d of the eccentric 20. In the present embodiment, the sleeve 30 is not in contact with the bearing 22, while the hub 23 is in contact with the bearing 21.

A seal member 50 is provided between the eccentric 20 and the hub 23 to seal a space in which the bearing 21 is placed, from outside (right side) in the axial direction. A seal member 51 is provided between the eccentric 20 and the sleeve 30 to seal a space in which the bearing 22 is placed, from outside in the axial direction. A seal member 52 is provided between the first coupling member 31 and the sleeve 30 to seal a space in which the bearing 33 is placed, from inside in the axial direction.

Figure 3:
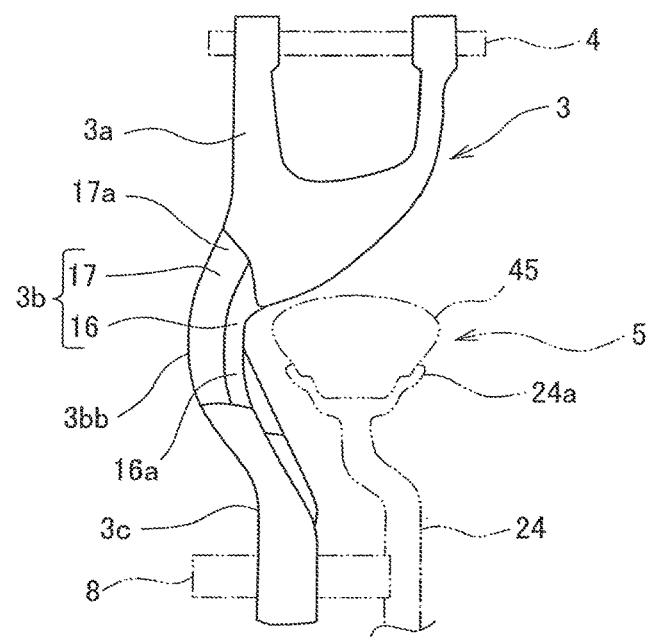
FIG. 3 is a plan view of a swing arm of the motorcycle of FIG. 1.

FIG. 3 is a plan view of the swing arm 3 of the motorcycle 1 of FIG. 1. As shown in FIG. 3, the swing arm 3 includes a plurality of constituents 3a, 3b (16, 17), 3c which are welded to each other. Specifically, the swing arm 3 includes the front portion 3a, the intermediate portion 3b, and the rear portion 3c which are arranged in the forward and rearward direction and connected to each other by welding. The intermediate portion 3b includes the inner element 16 located inward in the vehicle width direction and the outer element 17 located outward in the vehicle width direction, the inner element 16 and the outer element 17 being connected to each other by welding. The swing arm 3 has a hollow shape or an open cross-section to reduce its weight while ensuring its strength. In the present embodiment, since the swing arm 3 has a dividing structure, the swing arm 3 having the hollow shape can be easily formed.

The front portion 3a of the swing arm 3 is located in front of the rear wheel 5. The front portion 3a has a pair of right and left front end portions which are branch portions forming a substantially-U shape. The right and left front end portions of the front portion 3a are spaced apart from each other in the vehicle width direction, and extend in the direction (forward and rearward direction) in which the swing arm 3 extends. The right and left front end portions of the front portion 3a are supported on the pivot shaft 4 in such a manner that the front portion 3a is angularily displaceable. For example, the right and left front end portions of the front portion 3a are spaced apart from each other in the vehicle width direction, with a dimension that is equal to or greater than the width of the rim 24a. The rear end portion of the front portion 3a is located on a first side in the vehicle width direction with respect to the center of the axle. In the present embodiment, the rear end portion of the front portion 3a is located on a left side in the vehicle width direction.

The intermediate portion 3b is placed on the first side in the vehicle width direction with respect to the front portion of the tire 45. The intermediate portion 3b is placed to face the front portion of the tire 45, from outside in the vehicle width direction. The front end of the intermediate portion 3b is continuous with the front portion 3a, while the rear end of the intermediate portion 3b is continuous with the rear portion 3c. The inner side surface and outer side surface in the vehicle width direction of the intermediate portion 3b have a shape to allow the intermediate portion 3b to swell in the outward direction of the vehicle width direction, with respect to the front end and rear end of the intermediate portion 3b. In other words, the intermediate portion 3b includes a swelling portion 3bb which is located outward (leftward) in the vehicle width direction relative to the front portion 3a and the rear portion 3c and protrudes to a greatest degree in the outward direction of the vehicle width direction, in the swing arm 3. The outer surface of the swelling portion 3bb in the vehicle width direction is formed by the outer element 17.

The rear portion 3c is placed on the first side in the vehicle width direction with respect to the wheel 24. The rear portion 3c is placed to face the wheel 24 from outside in the vehicle width direction. The rear end portion of the rear portion 3c is provided with a support portion supporting the rear wheel axle 8 on the first side in the vehicle width direction with respect to the wheel 24. The rear portion 3c extends toward the center in the vehicle width direction as it extends in the extending direction of the swing arm 3, from its front end toward the support portion. In other words, when viewed from above, the rear portion 3c extends in the extending direction of the swing arm 3, along the edge of the wheel 24 on the first side in the vehicle width direction.

The surface roughness of the outer surface on the outer side in the vehicle width direction, of one of the plurality of constituents 3a, 3b (16, 17), 3c of the swing arm 3, is less than those of the outer surfaces of the remaining constituents. Specifically, the surface roughness of the outer surface on the outer side in the vehicle width direction, of the outer element 17 of the intermediate portion 3b, is less than those of the outer surfaces of the remaining constituents 3a, 3c, 16. For example, the outer element 17 of the intermediate portion 3b is manufactured by a sheet-metal press forming or a forging process, while the front portion 3a, the inner element 16 and the rear portion 3c are manufactured by a casting process. A portion (the front portion 3a and the rear portion 3c) of the swing arm 3, which is different from the outer element 17 manufactured by the sheet-metal press forming or the forging process, is provided with a support element supporting the pivot shaft 4 or the axle 8. For this reason, the outer member 17 has a simplified structure, and is easily formed by a plastic forming.

A dividing line defining the inner element 16 and the outer element 17 extends in the extending direction of the swing arm 3, through the intermediate region in the vehicle width direction, of the upper end surface of the intermediate portion 3b, when viewed from above. An upper end surface 16a of the inner element 16 and an upper end surface 17a of the outer element 17 are connected to each other in the vehicle width direction, to form the upper end surface of the intermediate portion 3b of the swing arm 3. Each of the front portion 3a and the rear portion 3b of the swing arm 3 has a unitary (undividable) structure in the vehicle width direction.

When viewed from the vehicle width direction, the outer element 17 is placed to overlap with the tire 45 attached to the rim 24a of the wheel 24. To be precise, the outer element 17 covers a greatest-width portion of the tire 45, from outside in the vehicle width direction (see FIG. 1). When viewed from the side, the foot rest 18 is located in front of the outer element 17, and covers the front portion 3a of the swing arm 3 from outside in the vehicle width direction (see FIG. 1). The driven member 31d around which the driving power transmission loop 7 is wrapped is located rearward relative to the outer element 17, and covers the rear portion 3c of the swing arm 3 from outside in the vehicle width direction (see FIG. 1).

The inner element 16 of the intermediate portion 3b may be made thicker or provided with a rib as a reinforcement member to increase its strength, compared to the outer element 17 of the intermediate portion 3b. This can ensure a stiffness of the swing arm 3, even when the outer element 17 is thinned. By thinning the outer element 17, the outer element 17 can be easily formed by the plastic forming, and as a result, a yield is increased.

Figure 4:
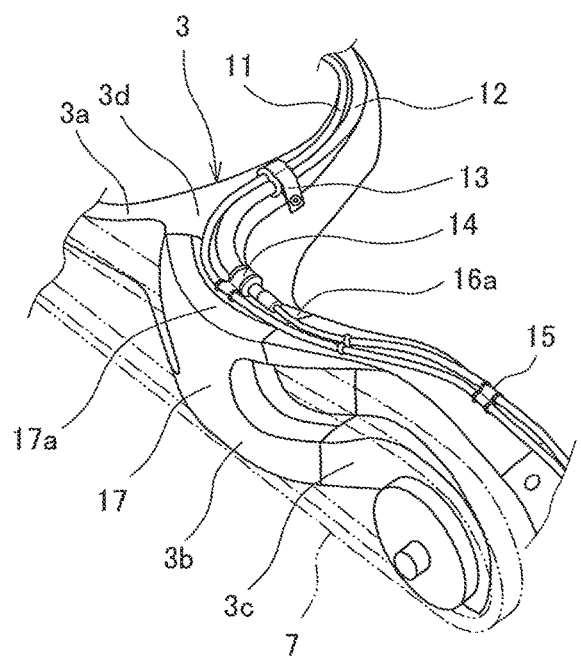
FIG. 4 is a perspective view of a configuration in which a sensor cable and a hydraulic pipe are mounted to the swing arm of the motorcycle of FIG. 1, obliquely from above, the rear, and the outside.
Figure 5:
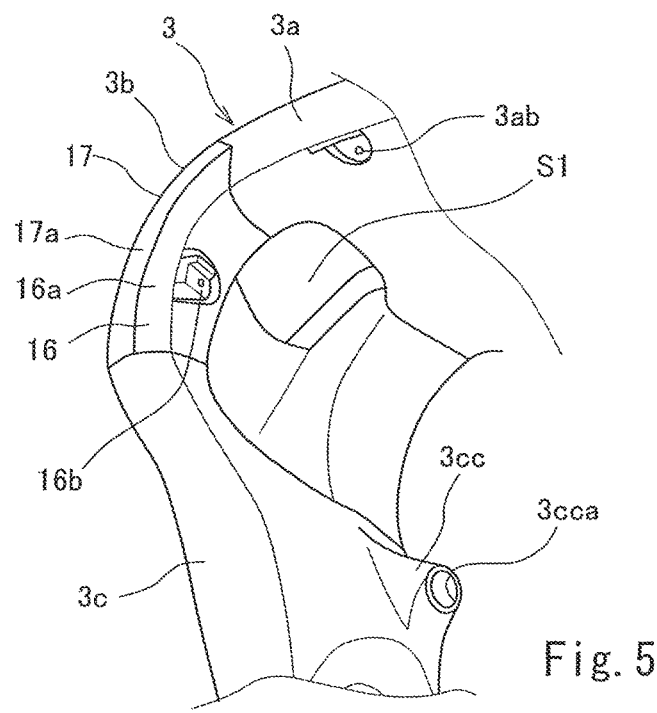
FIG. 5 is a perspective view of the intermediate portion of the swing arm of the motorcycle of FIG. 1, obliquely from above, the rear, and the inside.

FIG. 4 is a perspective view of a configuration in which a sensor cable 11 and a hydraulic pipe 12 are mounted to the swing arm 3 of the motorcycle 1 of FIG. 1, when viewed from obliquely above, rear and outside. FIG. 5 is a perspective view of the intermediate portion 3b of the swing arm 3 of the motorcycle of FIG. 1, when viewed from obliquely above, rear and inside. As shown in FIGS. 4 and 5, the sensor cable 11 and the hydraulic pipe 12 which are linear members extend in the forward and rearward direction along the upper end surface 3d of the swing arm 3. The front portion 3a, the inner element 16 and the rear portion 3c of the swing arm 3 are provided with support elements 3ab, 16b to support the sensor cable 11 and the hydraulic pipe 12. The outer element 17 of the swing arm 3 is not provided with a support element for supporting the sensor cable 11 and the hydraulic pipe 12.

In other words, the front portion 3a, the inner element 16 and the rear portion 3c of the swing arm 3, which are manufactured by the casting process are provided with the support elements 3ab, 16b, while the outer element 17 manufactured by the sheet-metal press forming or the forging process is not provided with the support element. The casting process is able to easily form an intricate shape in a steady state, compared to the sheet-metal press forming or the forging process. Therefore, the manufacture efficiency of the swing arm 3 is increased. Clamp members 13 to 15 are fixed to the support elements 3ab, 16b of the swing arm 3. The sensor cable 11 and the hydraulic pipe 12 are retained by the clamp members 13 to 15. The sensor cable 11 and the hydraulic pipe 12 extend through a region above the upper end surface 16a of the inner element 16, at the intermediate portion 3b of the swing arm 3.

Figure 6:
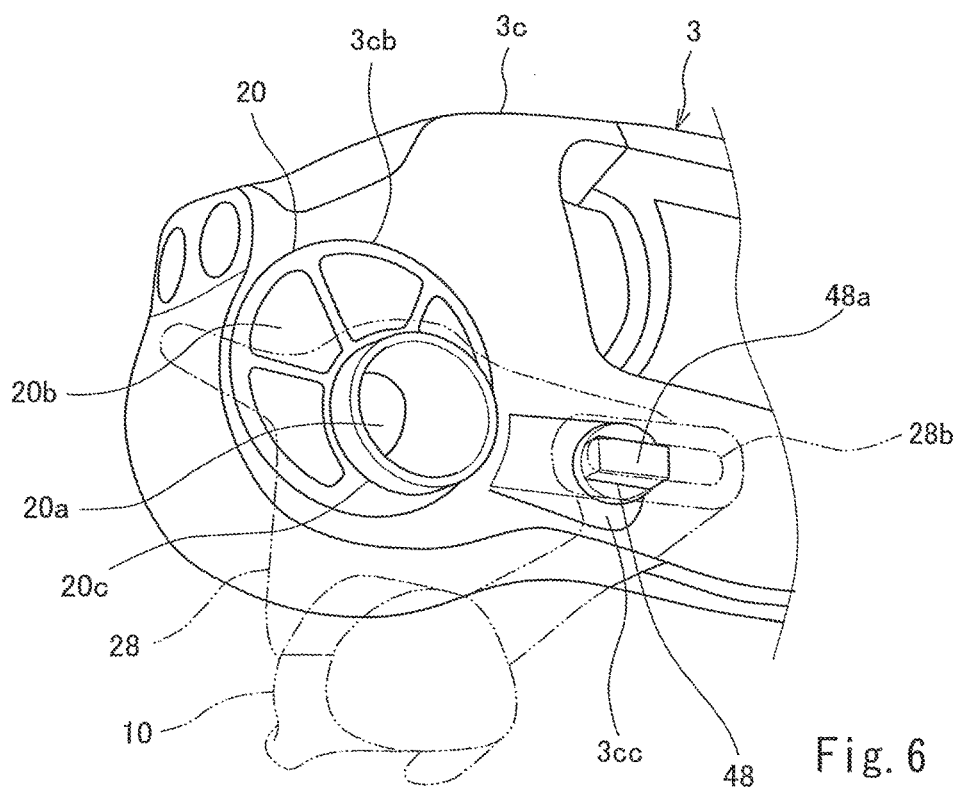
FIG. 6 is a perspective view of the rear portion of the swing arm of the motorcycle of FIG. 1, obliquely from below, the rear, and the inside.

FIG. 6 is a perspective view of the rear portion 3c of the swing arm 3 of the motorcycle 1 of FIG. 1, when viewed from obliquely below, rear and inside. As shown in FIG. 6, the eccentric 20 is formed with an eccentric hole 20a which opens to the right and the left, into which the axle 8 is inserted, and a plurality of lightening holes 20b which are arranged to be spaced apart from each other in the circumferential direction and open to the right and the left. In addition, the eccentric 20 is provided with a cylindrical portion 20c protruding in the inward direction (to the right) of the vehicle width direction, from the periphery of the eccentric hole 20a. The caliper holder 28 supporting the brake caliper 10 is fitted to the cylindrical portion 20c (see FIG. 1). The inner surface of the swing arm 3 in the vehicle width direction is provided with a protruding portion 3cc.

The protruding portion 3*cc* is formed with a mounting hole 3*cca* having a female thread. An engagement member 48 having an engagement portion 48*a* is threadingly engaged with the mounting hole 3*cca*.

The caliper holder 28 is provided with an engaged portion 28*b* which is engageable with the engagement portion 48*a*. Since the engagement portion 48*a* engages with the engaged portion 28*b*, the caliper holder 28 is inhibited from rotating around the cylindrical portion 20*c*. In the present embodiment, the engagement portion 48*a* is a protruding portion of a rectangular parallelepiped shape, while the engaged portion 28*b* is an elongated hole to which the engagement portion 48*a* is fitted. Since the swing arm 3 is provided with the protruding portion 3*cc*, the position of the engagement portion 48*a* in the vehicle width direction is aligned with the position of the engaged portion 48*a* in the vehicle width direction.

In accordance with the above-described configuration, since the joining portion 34*a* of the second coupling member 34 includes the extended portion 34*aa* extending to the region that is between the first coupling member 31 and the axle 8. In this structure, the second coupling member 34 is joined to a portion of the axle 8 which is located outward in the axial direction relative to the first coupling member 31, and to a portion of the axle 8 which overlaps with the first coupling member 31 in the axial direction. This structure can increase the axial dimension of the portion of the second coupling member 34 which is coupled to the axle 8. Thus, a strength of the portion of the driving power transmission mechanism through which the driving power is transmitted from the second coupling member 34 to the axle 8, can be increased, even though the driving power transmission mechanism has a compact configuration as a whole.

Further, the extended portion 34*aa* of the joining portion 34*a* of the second coupling member 34 is inserted into the region formed between the inner peripheral surface of the first coupling member 31 and the outer peripheral surface of the axle 8, and presses the bearing 33 in the inward direction of the axial direction. Thus, the second coupling member 34 directly presses the bearing 33 in the inward direction of the axial direction, and thus the bearing 33 is positioned in the axial direction, without fitting a collar or the like to the axle 8 between the second coupling member 34 and the bearing 33. As a result, the bearing 33 supporting the first coupling member 31 can be positioned easily at a proper location, without increasing the number of members.

The driven member 31*d* of the first coupling member 31 is placed to overlap with the buffering member 35 and the fitting portion 34*b* when viewed from the direction perpendicular to the axial direction. Therefore, when the buffering member 35 absorbs an acceleration impact transmitted from the driving power transmission loop 7 to the driven member 31*d*, it becomes possible to suppress a situation in which a force is concentratively transmitted to the axially localized portion of the buffering member 35. Since the bearing 33 is placed to partially overlap with the driven member 31*d* when viewed from the direction perpendicular to the axial direction, the bearing 33 can be placed at a portion of the first coupling member 31, on which a load concentrates due to the acceleration impact transmitted to the driven member 31*d*. Therefore, the performance of the bearing 33 can be improved, and the life of the bearing 33 can be extended. Further, the driven member 31*d* and the bearing 33 are located to correspond to the axial intermediate portion of the outer peripheral wall 31*b* and the axial intermediate portion of the inner peripheral wall 31*a*, respectively. In this layout, the portion of the first coupling member 31 to which the rotational driving power is transmitted from the driving power transmission loop 7 and the portion of the first coupling member 31 which is supported by the bearing 33 are provided at the intermediate location of the first coupling member 31 in the axial direction. As a result, the first coupling member 31 can be supported stably.

The bearing 33 is placed between the inner peripheral surface of the first coupling member 31 and the outer peripheral surface of the axle 8. The inner race of the bearing 33 is supported by the annular protruding portions 8*a*, 8*b* of the axle 8, protruding radially outward, from inside in the vehicle width direction. The outer race of the bearing 33 is supported by the first coupling member 31, from inside in the vehicle width direction. In this structure, the second coupling member 34 can be positioned with respect to the axle 8 in the axial direction, by use of the bearing 33 for the first coupling member 31

In a state in which the second coupling member 34 is coupled to the axle 8, the spline groove 8*f* of the axle 8 extends farther inward in the axial direction than the coupling spline groove 34*ab* of the second coupling member 34 does in such a manner that the inner end of the spline groove 8*f* in the axial direction L is located inward in the axial direction L relative to the inner end of the coupling spline groove 34*ab* in the axial direction L. In this structure, the spline-fitted portion can be increased without increasing the length of the axle 8. Thus, with a compact configuration, the second coupling member 34 and the axle 8 can be more firmly coupled to each other. Likewise, in a state in which the hub 23 is coupled to the axle 8, the spline groove 8*e* of the axle 8 extends farther inward in the axial direction L than the hub spline groove 23*a* of the hub 23 does in such a manner that the inner end of the spline groove 8*e* in the axial direction is located inward in the axial direction relative to the inner end of the hub spline groove 23*a* in the axial direction. In this structure, the spline-fitted portion can be increased without increasing the length of the axle 8. Thus, with a compact configuration, the hub 23 and the axle 8 can be more firmly joined to each other.

The first coupling member 31 and the second coupling member 34 are fastened from the left by use of the fastener member 39 so that the first coupling member 31 and the second coupling member 34 are positioned in the axial direction indirectly by the stepped portion 8*d*. The hub 23 is fastened by use of the fastener member 29 from the right so that the hub 23 is positioned in the axial direction indirectly by the stepped portion 8*c*. Thus, the first and second coupling members 31, 34, and the hub 23 can be more easily mounted to the axle 8 from the both sides in the axial direction.

The swelling portion 3*bb* of the swing arm 3, which protrudes outward in the axial direction to a greatest degree and includes the both side surfaces in the axial direction has a structure in which the inner element 16 located inward in the axial direction, and the outer element 17 located outward in the axial direction are welded to each other. The outer element 17 of the swelling portion 3*bb*, which is most easily noted, of the swing arm 3, can be made of a member with a surface roughness which is less than that of the inner element 16. As a result, the external appearance can be improved easily and effectively.

The swing arm 3 includes the front portion 3*a*, the intermediate portion 3*b* (the inner element 16 and the outer element 17), and the rear portion 3*c* which are arranged in the forward and rearward direction and connected to each other by welding. Therefore, the swing arm 3 of a complicated shape can be easily manufactured. The driving power transmission loop 7 extends through the openings S1, S2 of the swing arm 3 in the forward and rearward direction, and the intermediate portion 3b covers the driving power transmission loop 7 from outside in the vehicle width direction. In this layout, the outer element 17 with a lesser surface roughness can cover the driving power transmission loop 7, when viewed from the side.

The present invention is not limited to the above-described embodiment. The above-described configuration may be changed, added to, or deleted from, within a scope of the spirit of the preset invention. Although in the above-described embodiment, an example in which the present invention is applied to the motorcycle has been described, the present invention is applicable to straddle-type vehicles steered by the rider straddling the seat. The straddle-type vehicle includes an all-terrain vehicle (ATV), etc., in addition to the motorcycle. The straddle-type vehicle may include the engine (internal combustion engine), an electric motor, or the engine and the electric motor, as the driving source.

The driving power transmission loop 7 may be a drive belt instead of the drive chain. In that case, a pulley is fixed to the first coupling member 31. The rotational driving power of the driving source may be transmitted to the damper device 9 via a driving power transmission member such as a drive shaft or a gear, instead of the driving power transmission loop 7. In a case where the drive shaft is used, a bevel gear is fixed to the first coupling member 31. Further, the bearing 33 supporting the first coupling member 31 may be placed between the extended portion 34aa of the joining portion 34a of the second coupling member 34, and the first coupling member 31. Further, the outer surface of the outer element 17 of the swing arm 3 may be subjected to a surface treatment (e.g., polishing processing) for smoothing the surface of the outer element 17 so that the surface roughness of the outer surface of the outer element 17 becomes less than that of the remaining portion of the swing arm 3. In that case, the outer element 17 may be manufactured by the casting process as in the constituents 3a, 3c, 16. Further, the first and second coupling members 31, 34 may be positioned in the axial direction directly by the stepped portion 8d, and the hub 23 may be positioned in the axial direction directly by the stepped portion 8c.

The second coupling member 34 and the hub 23 may be removably coupled to the axle 8, by a keyway, a key or a fastener member such as a bolt, as well as the spline. The buffering member 35 may be made of a spring material having a resilient characteristic, as well as the resin. Although in the present embodiment, the swing arm 3 has a structure in which the outer element 17 with a surface roughness that is less than that of the remaining portion is provided on the outer side of the intermediate portion 3b, the structure of the swing arm 3 is not limited to this. For example, in a case where the front portion 3a or the rear portion 3c of the swing arm 3 has a structure in which separate members are welded to each other in the vehicle width direction, the outer element 17 of the intermediate portion 3b may be extended as the outer portion in the vehicle width direction, of the front portion 3a or the rear portion 3c of the swing arm 3. Although in the present embodiment, the inner element 16 and the outer element 17 are formed by different methods, this is merely exemplary. For example, the inner element 16 and the outer element 17 may be formed by the same method and may be thereafter subjected to different post-processing. For example, the outer element 17 may be subjected to a surface treatment for making the degree of surface roughness less than that of the inner element 16.

In a case where the inner element 16 and the outer element 17 are manufactured by the casting, a casting method which makes the degree of surface roughness of the outer element 17 less than that of the inner element 16 may be used. The outer element 17 may be formed by, for example, a cutting process, instead of the plastic forming. Further, the outer element 17 may include a portion of the swing arm 3, which is located outward in the vehicle width direction relative to at least the driving power transmission loop 7. For example, in a case where the front portion 3a or the rear portion 3c of the swing arm 3 includes a portion located outward in the vehicle width direction relative to the driving power transmission loop 7, this portion may be formed as the above-described outer element.

INDUSTRIAL APPLICABILITY

As described above, a straddle-type vehicle of the present invention has an advantage that a strength of a portion of a driving power transmission mechanism to which driving power is transmitted from a second coupling member to an axle can be increased, even though the driving power transmission mechanism has a compact configuration. The present invention is effectively widely used in straddle-type vehicles such as a motorcycle which can obtain this advantage.

LIST OF REFERENCE CHARACTERS 1 motorcycle
2 vehicle body frame
3 swing arm
3bb swelling portion
5 rear wheel
8 axle
8a, 8b annular protruding portion
8c, 8d stepped portion
8e, 8f spline groove
9 damper device
16 inner element
17 outer element
23 hub
23a hub spline groove
29, 39 fastener member
31 first coupling member
31a inner peripheral wall
31b outer peripheral wall
31c side wall
31d driven member
33 bearing
34 second coupling member
34a joining portion
34aa extended portion
34ab coupling spline groove
34b fitting portion
34c *coupling portion*
35 buffering member

The invention claimed is:
1. A straddle vehicle comprising:
a vehicle body frame to which a driving source for generating traveling driving power is mounted;
an axle which is rotatable integrally with a wheel;

a swing arm having a front end portion mounted to the vehicle body frame in such a manner that the swing arm is pivotable, and a rear end portion to which the axle is rotatably mounted;

a first coupling member which includes a driven member to which rotational driving power from the driving source is transmitted, is placed coaxially with the axle, and is mounted to the axle via a bearing in such a manner that the first coupling member is relatively rotatable with respect to the axle;

a second coupling member including a joining portion joined to the axle in such a manner that the joining portion is rotatable together with the axle, a fitting portion fitted to the first coupling member via a buffering member, and a coupling portion for coupling the joining portion to the fitting portion, the second coupling member being placed coaxially with the axle; and a hub coupled to the axle, wherein the first coupling member and the second coupling member are fastened from a first side in an axial direction by use of a first fastener member, and wherein the hub is fastened from a second side in the axial direction by use of a second fastener member, wherein the axle is provided with a first spline groove and a second spline groove, wherein the second coupling member is provided with a coupling spline groove which is spline-coupled to the first spline groove, wherein the hub is provided with a hub spline groove which is spline-coupled to the second spline groove, and wherein the axle includes a first stepped portion and a second stepped portion which are placed between the first spline groove and the second spline groove.

2. The straddle vehicle according to claim 1, wherein the first coupling member includes a tubular wall provided coaxially with the axle, and wherein the driven member is provided integrally with the tubular wall.

3. The straddle vehicle according to claim 1, wherein the coupling portion is provided with a rib protruding outward in the axial direction.

4. The straddle vehicle according to claim 1, wherein the bearing is placed between an inner peripheral surface of the first coupling member and an outer peripheral surface of the axle, wherein an inner race of the bearing is supported from inside in a vehicle width direction, by a protruding portion of the axle which protrudes radially outward, and wherein an outer race of the bearing is supported from inside in the vehicle width direction, by the first coupling member.

5. A straddle vehicle comprising:

a vehicle body frame to which a driving source for generating traveling driving power is mounted;

an axle which is rotatable integrally with a wheel;

a swing arm having a front end portion mounted to the vehicle body frame in such a manner that the swing arm is pivotable, and a rear end portion to which the axle is rotatably mounted;

a first coupling member which includes a driven member to which rotational driving power from the driving source is transmitted, is placed coaxially with the axle, and is mounted to the axle via a bearing in such a manner that the first coupling member is relatively rotatable with respect to the axle;

a second coupling member including a joining portion joined to the axle in such a manner that the joining portion is rotatable together with the axle, a fitting portion fitted to the first coupling member via a buffering member, and a coupling portion for coupling the joining portion to the fitting portion, the second coupling member being placed coaxially with the axle; and a hub coupled to the axle, wherein the axle is provided with a first spline groove and a second spline groove, wherein the second coupling member is provided with a coupling spline groove which is spline-coupled to the first spline groove, wherein the hub is provided with a hub spline groove which is spline-coupled to the second spline groove, and wherein the axle includes a first stepped portion and a second stepped portion which are placed between the first spline groove and the second spline groove.

6. The straddle vehicle according to claim 5, wherein an axial dimension of the joining portion is substantially equal to that of the first coupling member.

7. The straddle vehicle according to claim 5, wherein an axial outer end surface of the joining portion is located outward in the axial direction relative to the coupling portion.

8. A straddle vehicle comprising:

a vehicle body frame to which a driving source for generating traveling driving power is mounted;

an axle which is rotatable integrally with a wheel;

a swing arm having a front end portion mounted to the vehicle body frame in such a manner that the swing arm is pivotable, and a rear end portion to which the axle is rotatably mounted;

a first coupling member which includes a driven member to which rotational driving power from the driving source is transmitted, is placed coaxially with the axle, and is mounted to the axle via a bearing in such a manner that the first coupling member is relatively rotatable with respect to the axle;

a second coupling member including a joining portion joined to the axle in such a manner that the joining portion is rotatable together with the axle, a fitting portion fitted to the first coupling member via a buffering member, and a coupling portion for coupling the joining portion to the fitting portion, the second coupling member being placed coaxially with the axle; and a hub coupled to the axle, wherein the first coupling member further includes a tubular inner peripheral wall provided coaxially with the axle, a tubular outer peripheral wall which is provided coaxially with the axle and located radially outward relative to the inner peripheral wall, and a side wall of an annular disc shape which is provided coaxially with the axle and couples the outer peripheral wall to the inner peripheral wall, and wherein the driven member is placed at an intermediate portion of the outer peripheral wall in an axial direction.

9. A straddle vehicle comprising:

a vehicle body frame to which a driving source for generating traveling driving power is mounted;

an axle which is rotatable integrally with a wheel;

a swing arm having a front end portion mounted to the vehicle body frame in such a manner that the swing arm is pivotable, and a rear end portion to which the axle is rotatably mounted;

a first coupling member which includes a driven member to which rotational driving power from the driving source is transmitted, is placed coaxially with the axle, and is mounted to the axle via a bearing in such a manner that the first coupling member is relatively rotatable with respect to the axle;

a second coupling member including a joining portion joined to the axle in such a manner that the joining portion is rotatable together with the axle, a fitting portion fitted to the first coupling member via a buffering member, and a coupling portion for coupling the joining portion to the fitting portion, the second coupling member being placed coaxially with the axle; and a hub coupled to the axle, wherein the driven member is placed to overlap with the joining portion when viewed from a direction perpendicular to an axial direction.

10. A straddle vehicle comprising:

a vehicle body frame to which a driving source for generating traveling driving power is mounted;

an axle which is rotatable integrally with a wheel;

a swing arm having a front end portion mounted to the vehicle body frame in such a manner that the swing arm is pivotable, and a rear end portion to which the axle is rotatably mounted;

a first coupling member which includes a driven member to which rotational driving power from the driving source is transmitted, is placed coaxially with the axle, and is mounted to the axle via a bearing in such a manner that the first coupling member is relatively rotatable with respect to the axle;

a second coupling member including a joining portion joined to the axle in such a manner that the joining portion is rotatable together with the axle, a fitting portion fitted to the first coupling member via a buffering member, and a coupling portion for coupling the joining portion to the fitting portion, the second coupling member being placed coaxially with the axle; and a hub coupled to the axle, wherein the first coupling member further includes a tubular inner peripheral wall provided coaxially with the axle, a tubular outer peripheral wall which is provided coaxially with the axle and located radially outward relative to the inner peripheral wall, and a side wall of an annular disc shape which is provided coaxially with the axle and couples the outer peripheral wall to the inner peripheral wall, and wherein the driven member is placed at an intermediate portion of the outer peripheral wall in an axial direction and overlaps with the joining portion when viewed from a direction perpendicular to the axial direction.

11. A straddle vehicle comprising:

a vehicle body frame to which a driving source for generating traveling driving power is mounted;

an axle which is rotatable integrally with a wheel;

a swing arm having a front end portion mounted to the vehicle body frame in such a manner that the swing arm is pivotable, and a rear end portion to which the axle is rotatably mounted;

a first coupling member which includes a driven member to which rotational driving power from the driving source is transmitted, is placed coaxially with the axle, and is mounted to the axle via a bearing in such a manner that the first coupling member is relatively rotatable with respect to the axle;

a second coupling member including a joining portion joined to the axle in such a manner that the joining portion is rotatable together with the axle, a fitting portion fitted to the first coupling member via a buffering member, and a coupling portion for coupling the joining portion to the fitting portion, the second coupling member being placed coaxially with the axle; and a hub coupled to the axle, wherein the axle is provided with a first spline groove, wherein the second coupling member is provided with a coupling spline groove which is spline-coupled to the first spline groove, and wherein in a state in which the second coupling member is coupled to the axle, the first spline groove extends farther inward in an axial direction than the coupling spline groove in such a manner that an inner end of the first spline groove in the axial direction is located inward in the axial direction relative to an inner end of the coupling spline groove in the axial direction.

12. A straddle vehicle comprising:

a vehicle body frame to which a driving source for generating traveling driving power is mounted;

an axle which is rotatable integrally with a wheel;

a swing arm having a front end portion mounted to the vehicle body frame in such a manner that the swing arm is pivotable, and a rear end portion to which the axle is rotatably mounted;

a first coupling member which includes a driven member to which rotational driving power from the driving source is transmitted, is placed coaxially with the axle, and is mounted to the axle via a bearing in such a manner that the first coupling member is relatively rotatable with respect to the axle;

a second coupling member including a joining portion joined to the axle in such a manner that the joining portion is rotatable together with the axle, a fitting portion fitted to the first coupling member via a buffering member, and a coupling portion for coupling the joining portion to the fitting portion, the second coupling member being placed coaxially with the axle; and a hub coupled to the axle, wherein the first coupling member and the second coupling member are fastened from a first side in an axial direction by use of a first fastener member, and wherein the hub is fastened from a second side in the axial direction by use of a second fastener member, wherein the second coupling member and the hub are coupled to each other in such a manner that the second coupling member and the hub are slidable in the axial direction with respect to the axle, and are rotatable together with the axle, wherein the axle includes a first stepped portion which protrudes radially outward at an intermediate portion in the axial direction, and faces the first side in the axial direction, and a second stepped portion which protrudes radially outward at the intermediate portion in the axial direction, and faces the second side in the axial direction, wherein the first and second coupling members are fastened from the first side in the axial direction, by the first fastener member in such a manner that the first and second coupling members are positioned in the axial direction directly or indirectly by the first stepped portion, and wherein the hub is fastened from the second side in the axial direction, by the second fastener member in such a manner that the hub is positioned in the axial direction directly or indirectly by the second stepped portion.

13. A straddle vehicle comprising:
a vehicle body frame to which a driving source for generating traveling driving power is mounted;
an axle which is rotatable integrally with a wheel;
a swing arm having a front end portion mounted to the vehicle body frame in such a manner that the swing arm is pivotable, and a rear end portion to which the axle is rotatably mounted;
a first coupling member which includes a driven member to which rotational driving power from the driving source is transmitted, is placed coaxially with the axle, and is mounted to the axle via a bearing in such a manner that the first coupling member is relatively rotatable with respect to the axle;
a second coupling member including a joining portion joined to the axle in such a manner that the joining portion is rotatable together with the axle, a fitting portion fitted to the first coupling member via a buffering member, and a coupling portion for coupling the joining portion to the fitting portion, the second coupling member being placed coaxially with the axle; and
a hub coupled to the axle,
wherein the first coupling member and the second coupling member are fastened from a first side in an axial direction by use of a first fastener member, and
wherein the hub is fastened from a second side in the axial direction by use of a second fastener member,
wherein the axle is provided with a second spline groove to which the hub is spline-coupled,
wherein the hub is provided with a hub spline groove which is spline-coupled to the second spline groove, and
wherein in a state in which the hub is coupled to the axle, the second spline groove extends farther inward in the axial direction than the hub spline groove does in such a manner that an inner end of the second spline groove in the axial direction is located inward in the axial direction relative to an inner end of the hub spline groove in the axial direction.

14. A straddle vehicle comprising:
a vehicle body frame to which a driving source for generating traveling driving power is mounted;
an axle which is rotatable integrally with a wheel;
a swing arm having a front end portion mounted to the vehicle body frame in such a manner that the swing arm is pivotable, and a rear end portion to which the axle is rotatably mounted;
a first coupling member which includes a driven member to which rotational driving power from the driving source is transmitted, is placed coaxially with the axle, and is mounted to the axle via a bearing in such a manner that the first coupling member is relatively rotatable with respect to the axle;
a second coupling member including a joining portion joined to the axle in such a manner that the joining portion is rotatable together with the axle, a fitting portion fitted to the first coupling member via a buffering member, and a coupling portion for coupling the joining portion to the fitting portion, the second coupling member being placed coaxially with the axle; and
a hub coupled to the axle,
wherein the first coupling member and the second coupling member are fastened from a first side in an axial direction by use of a first fastener member, and
wherein the hub is fastened from a second side in the axial direction by use of a second fastener member, and
wherein a swelling portion of the swing arm, which protrudes outward in the axial direction to a greatest degree, and includes both side surfaces in the axial direction, has a structure in which an inner element located inward in the axial direction and an outer element located outward in the axial direction are welded to each other.

15. The straddle vehicle according to claim 14, wherein the outer element has a surface roughness which is less than a surface roughness of the inner element.

16. The straddle vehicle according to claim 14, wherein the inner element is provided with a cable support structure.

* * * * *